Alford & Pitkin.
Pipe Coupling.

Nº 99,744.  Patented Feb. 15, 1870.

Witnesses;
Jnº D. Patten
Edmund Masson

Inventors;
W. D. Alford & J. H. Pitkin
By Atty A. B. Stoughton

United States Patent Office.

WILLIAM D. ALFORD AND J. H. PITKIN, OF CUYAHOGA FALLS, OHIO.

Letters Patent No. 99,744, dated February 15, 1870.

IMPROVEMENT IN PIPE-COUPLINGS.

The Schedule referred to in these Letters Patent and making part of the same.

*To all whom it may concern:*

Be it known that we, WILLIAM D. ALFORD and J. H. PITKINS, of Cuyahoga Falls, in the county of Summit, and State of Ohio, have invented certain new and useful Improvements in Couplings for Heating-Pipes; and we do hereby declare the following to be a full, clear and exact description of the same, reference being had to the accompanying drawings making a part of this specification, in which—

Figure 1:
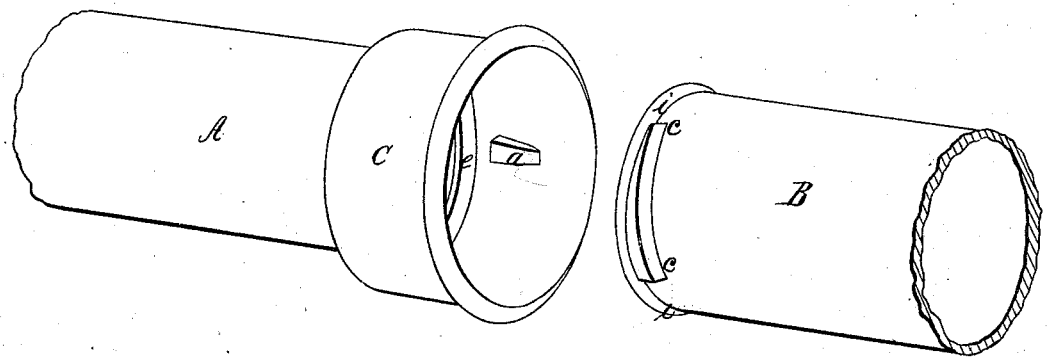
Figure 2:
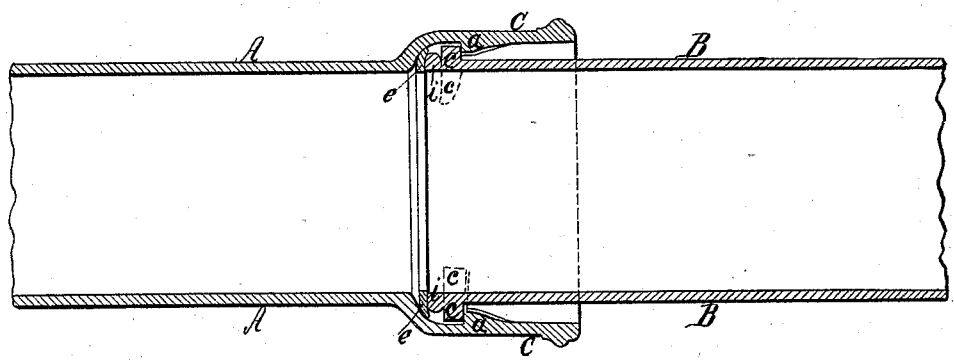

Figure 1 represents in perspective the ends of two pipes furnished with our proposed coupling, and Figure 2 represents a longitudinal section through the two ends of the united pipes, coupled by the device in question.

Similar letters of reference, where they occur in the separate figures, denote like parts in both of them.

In pipes used for conveying or transmitting heated air or gas, and which are subjected to high and then to low temperatures so frequently, the expansion and contraction of the metal causes the joints to become loose and leaky.

The object of our invention is to prevent this loosening of the joints.

Pipe-couplings of many kinds have been devised, but they generally, if not universally, go together and are held together by a third piece of some kind, the fastenings not being cast on the pipes themselves, so as to require no dressing or fitting, or pieces to be looked up and liable to be mislaid. And even where a third, or more separate pieces are used, there are projections of some kind on the exterior of the pipes to be so joined, that are unsightly and liable to injury in handling or transportation.

Hose-couplings have been held together by fastenings or devices cast upon the two parts to be coupled. But the packing of the joint was to be done by the pressure of the water passing through the hose, and the devices had no means of drawing the pipes together in the line of their length.

Our invention consists in uniting pipes that are subjected to sudden and frequent expansion and contraction by means of wedge-shaped projections on one, and shoulders or projections upon the other, for the wedges to take against, so that when the end of a pipe so furnished is slipped into the socket or bell of the other, and turned in the direction of its short axis, it will draw itself, or be drawn, tight up against its mate or fellow, and be firmly held there.

To enable others skilled in the art to make and use our invention we will proceed to describe the same with reference to the drawings.

A represents a cast-iron pipe, upon which the common socket or bell C is cast, in the usual way.

In the interior of the bell are cast on and with it two lugs *a a*, that form shoulders near the bottom of the bell.

On the pipe B, that is to be coupled with that A, are cast two wedge-shaped sections, *c c*, at such distance from the end of the pipe as will enable their points to readily take against the shoulders of the lugs *a a*, then by turning one or both of the pipes a part of a rotation, the two parts are drawn up tightly together.

A packing-ring, *e*, of any suitable material, may be introduced between the beaded end *i* of the pipe B and the bottom of the bell or socket, to close the joint perfectly tight if so desired.

The object of the lugs and wedges is to prevent the pipes from being drawn apart by the expansion and contraction of the pipes.

If the joint is to be packed, it may be done in any of the usual well-known ways of so doing.

We have described the lugs as cast upon or in the bell-end of the pipe A, and the wedge projections on the end of the pipe B. They may be reversed, but we prefer to make them as shown.

Having thus fully described our invention,

What we claim therein as new, and desire to secure by Letters Patent, is—

In combination with the joint or coupling of heating-pipes made tight by packing driven into the socket around the inserted end of the pipe, the lugs cast in the bottom of the socket and upon the end of the pipe to prevent them from being drawn apart, together with the space around the pipe in the socket to receive the packing, substantially as and for the purpose described.

WM. D. ALFORD.
J. H. PITKIN.

Witnesses:
CHARLES J. HENSHAW, M. D.,
C. P. HUMPHREY.